(12) United States Patent
Li et al.

(10) Patent No.: US 10,145,933 B2
(45) Date of Patent: Dec. 4, 2018

(54) ANGLE DETERMINING SYSTEM AND METHOD

(71) Applicant: ZTE Corporation, Shenzhen (CN)

(72) Inventors: Chao Li, Shenzhen (CN); Wen Leng, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 441 days.

(21) Appl. No.: 14/769,328

(22) PCT Filed: Aug. 20, 2013

(86) PCT No.: PCT/CN2013/081828
§ 371 (c)(1),
(2) Date: Aug. 20, 2015

(87) PCT Pub. No.: WO2014/127612
PCT Pub. Date: Aug. 28, 2014

(65) Prior Publication Data
US 2016/0011292 A1    Jan. 14, 2016

(30) Foreign Application Priority Data

Feb. 22, 2013  (CN) .......................... 2013 1 0057032

(51) Int. Cl.
| | | |
|---|---|---|
| *H01Q 3/00* | (2006.01) | |
| *G01S 3/58* | (2006.01) | |
| *G01S 3/14* | (2006.01) | |
| *G01S 3/28* | (2006.01) | |
| *G01S 3/06* | (2006.01) | |

(Continued)

(52) U.S. Cl.
CPC ................. *G01S 3/58* (2013.01); *G01S 3/143* (2013.01); *G01S 3/28* (2013.01); *G01S 3/06* (2013.01);
(Continued)

(58) Field of Classification Search
CPC ... G01S 3/58; G01S 3/28; G01S 3/143; G01S 3/06; H01Q 1/1257; H01Q 3/2623; H01Q 25/002
(Continued)

(56) References Cited

U.S. PATENT DOCUMENTS 6,683,566 B2 * 1/2004 Jeon .................... G01S 3/023
342/375
7,085,541 B2 * 8/2006 Redi ..................... H04W 52/10
342/367

(Continued)

FOREIGN PATENT DOCUMENTS

CN   101458322 A   6/2009
CN   102045837 A   5/2011
(Continued)

OTHER PUBLICATIONS

Anatoly Rembovsky, et al., Radio Monitoring: Problems, Methods and Equipment (Lecture Notes in Electrical Engineering) vol. 43, Feb. 25, 2012, XP002754468.

(Continued)

*Primary Examiner* — Chuong P Nguyen
(74) *Attorney, Agent, or Firm* — Cantor Colburn LLP (57) ABSTRACT

Provided are a system and a method for determining an angle. The method includes: determining differences between signal strengths of incident waves received by a first directional antenna of an anchor node from a tested node and signal strengths of incident waves received by a second directional antenna of the anchor node from the tested node at multiple angles, wherein the first directional antenna and the second directional antenna are mounted at a same point, and an area formed by the first directional antenna is partially superposed with an area formed by the second directional antenna; and taking an angle corresponding to a minimum difference in the differences as an angle (Continued)

between a line connecting the anchor node and the tested node and a horizontal reference line. The present technical solution achieves the technical effect of positioning a target accurately when the positioning device is low in complexity.

18 Claims, 7 Drawing Sheets (51) Int. Cl.
| | |
|---|---|
| H01Q 25/00 | (2006.01) |
| H01Q 1/12 | (2006.01) |
| H01Q 3/26 | (2006.01) |
| H04W 64/00 | (2009.01) |

(52) U.S. Cl.
CPC ......... *H01Q 1/1257* (2013.01); *H01Q 3/2623* (2013.01); *H01Q 25/002* (2013.01); *H04W 64/006* (2013.01)

(58) Field of Classification Search
USPC .................................................. 342/359, 437
See application file for complete search history.

(56) References Cited

U.S. PATENT DOCUMENTS

| | | | | |
|---|---|---|---|---|
| 7,123,940 | B1* | 10/2006 | Rausch | H04W 16/24 455/562.1 |
| 7,313,403 | B2* | 12/2007 | Gong | G01S 3/28 455/404.2 |
| 7,633,442 | B2* | 12/2009 | Chiang | H01Q 3/24 342/432 |
| 8,681,048 | B2* | 3/2014 | Nishida | G01S 1/10 342/367 |
| 8,810,451 | B2* | 8/2014 | Xie | H01Q 1/125 342/359 |
| 9,560,623 | B2* | 1/2017 | Li | H04W 64/00 |
| 9,872,337 | B2* | 1/2018 | Ayach | H04W 84/12 |
| 2005/0246334 | A1* | 11/2005 | Tao | G01S 5/0252 |
| 2010/0177000 | A1* | 7/2010 | Brisebois | H01Q 1/1257 343/703 |
| 2014/0206414 | A1* | 7/2014 | Oh | H04B 7/0404 455/562.1 |
| 2017/0180028 | A1* | 6/2017 | Maltsev | H04B 7/0617 |

FOREIGN PATENT DOCUMENTS

| | | |
|---|---|---|
| CN | 102565755 A | 7/2012 |
| EP | 0893893 A2 | 1/1999 |
| JP | H1183970 A | 3/1999 |

OTHER PUBLICATIONS

European Search Report for corresponding application EP 13 87 5815; Report dated Mar. 4, 2016.
International Search Report for corresponding application PCT/CN2013/081828 filed Aug. 20, 2013; dated Nov. 21, 2013.

* cited by examiner

```
┌─────────────────────────────────────────────────┐
│ Determining differences between signal strengths of incident │
│ waves received by a first directional antenna of an anchor node │
│ from a tested node and signal strengths of incident waves received │
│ by a second directional antenna of the anchor node from the tested │──── S602
│ node at multiple angles, wherein the first directional antenna and │
│ the second directional antenna are mounted at a same point, and │
│ the area formed by the first directional antenna is superposed with │
│ the area formed by the second directional antenna partially │
└─────────────────────────────────────────────────┘
                            ↓
┌─────────────────────────────────────────────────┐
│ Taking an angle corresponding to a minimum difference in the │
│ differences as an angle between a line connecting the anchor node │──── S604
│ and the tested node and a horizontal reference line │
└─────────────────────────────────────────────────┘
```

ANGLE DETERMINING SYSTEM AND METHOD

TECHNICAL FIELD

The present disclosure relates to the field of communications, specifically to a system and a method for determining an angle.

BACKGROUND

With the rapid development of the positioning technology and the information technology, a Location-Based Service (LBS) has currently become an important part of the information services. When the outdoor positioning is mainly implemented by the Global Positioning System (GPS), the high-accuracy indoor positioning, as the positioning at the most detailed level, has accounted for an increasing proportion in the management of "digital city". According to investigation, services regarding to positioning requirements and potential applications may bring marketing income of up to billions of dollars every year in the future, including a large number of indoor high-accuracy positioning requirements.

The current short-distance positioning is classified into a range-based positioning and a range-free positioning. Considering the positioning principles of the two types of position, the range-based positioning has a higher accuracy than that of the range-free positioning. At present, the range-based positioning has become a main research direction of the short-distance positioning. The range-based positioning is carried out mainly based on the measurement and estimation of the following parameters: Received Signal Strength Indication (RSSI), Time Of Arrival (TOA) which reflects the transmission time of a signal between nodes, Time Difference of Arrival (TDOA) which represents the difference of the transmission time of a signal from a tested node to two anchor nodes, and Angle Of Arrival (AOA) which represents the angle information between nodes.

The above-mentioned positioning technologies are specifically described below.

1) AOA technology: AOA estimation is to estimate AOA by measuring the received signal of each antenna array element in one antenna array via a multi-antenna technology (also called intelligent antenna technology), and then estimate the location of an unknown node according to the AOA. The AOA technology requires the condition of multiple antennas, i.e., the condition of an antenna array, and also has a higher requirement to the processing of a baseband signal, therefore, the implementation for both the hardware and the algorithm is very complex.

2) TOA technology: TOA estimation is to estimate the distance between a receiving antenna and a transmitting antenna according to the time of propagation of a signal transmitted by the transmitting antenna between the transmitting antenna and the receiving antenna. To estimate the propagation of a radio wave, especially the short-distance propagation of the radio wave, it is required that the receiving and the transmitting antennas should be in a very accurate synchronization relationship and the receiving antenna should have a very accurate clock, otherwise, a very small time difference may cause a very large distance error.

3) TDOA technology: TDOA estimation is to perform an estimation based on the difference of time when a radio wave transmitted by the transmitting antenna arrives at different receiving antennas and is developed from the TOA technology. Since the analyzed object is the time difference instead of absolute arrival time required by the TOA, the requirement on strict time synchronization in the TOA technology is reduced. However, the distance between the receiving antenna and the transmitting antenna is estimated according to a time parameter, therefore, the short-distance positioning still has a very high requirement to the accuracy of the clock of the receiving antenna.

4) RSSI technology: the RSSI technology is to estimate the distance between the receiving antenna and the transmitting antenna according to the RSSI received by the receiving antenna from the transmitting antenna mainly according to the principle that the RSSI and the distance are in an inverse proportion. The receiving antenna can extract the RSSI very easily, therefore, the RSSI technology is the most common short-distance positioning technology at present, but the technology has the defects of low accuracy and poor stability.

To solve the problem, there is still no effective solution yet.

SUMMARY

Embodiments of the present disclosure provide a system and a method for determining an angle, in order to at least solve the technical problem that a high positioning accuracy and a low complexity of a positioning device cannot be realized at the same time in the related arts.

In one aspect, an embodiment of the present disclosure provides a system for determining an angle, including: an anchor node, a driver and a data processor, wherein the anchor node includes a first directional antenna and a second directional antenna; the first directional antenna and the second directional antenna are mounted at a same point, and an area formed by the first directional antenna is partially superposed with an area formed by the second directional antenna; the driver is coupled with the anchor node and is configured to drive the first directional antenna and the second directional antenna to rotate according to a predetermined angle with the anchor node as a center and a horizontal line, which is parallel to a horizontal plane and points to a predetermined direction, as a horizontal reference line to receive incident waves from a tested node at multiple angles; and the data processor is coupled with the anchor node and is configured to compute differences between signal strengths of incident waves received by the first directional antenna and signal strengths of incident waves received by the second directional antenna at the multiple angles, and determine an angle between a line connecting the anchor node and the tested node and the horizontal reference line according to the differences at the multiple angles.

In an example embodiment, the data processor is configured to take an angle corresponding to a minimum difference in the differences as the angle between the line connecting the anchor node and the tested node and the horizontal reference line.

In an example embodiment, the anchor node further includes: an omnidirectional antenna which is configured to receive incident waves from the tested node; and the data processor is further configured to determine whether the incident waves received by the first directional antenna and the second directional antenna are direct waves according to the incident waves received by the omnidirectional antenna.

In an example embodiment, the driver is an angle stepping motor.

In an example embodiment, the driver is configured to drive the first directional antenna and the second directional antenna to rotate within an angle range of 0 to 180 DEG at a step of 0.225 DEG.

In an example embodiment, the system for determining the angle is a positioning system.

In another aspect, an embodiment of the present disclosure provides a method for determining an angle, including: differences between signal strengths of incident waves received by a first directional antenna of an anchor node from a tested node and signal strengths of incident waves received by a second directional antenna of the anchor node from the tested node at multiple angles are determined, wherein the first directional antenna and the second directional antenna are mounted at a same point, and an area formed by the first directional antenna is partially superposed with an area formed by the second directional antenna; and an angle corresponding to a minimum difference in the differences is taken as an angle between a line connecting the anchor node and the tested node and a horizontal reference line, wherein the horizontal reference line is a horizontal line which is parallel to a horizontal plane and points to a predetermined direction.

In an example embodiment, before the differences of the signal strengths are determined, the method further includes: the anchor node is rotated within an angle range of 0 to 180 DEG with the anchor node as a center and a horizontal line parallel to the horizontal plane as the horizontal reference line so that the first directional antenna and the second directional antenna receive the incident waves sent by the tested node at multiple angles.

In an example embodiment, the step that the differences of the signal strengths are determined includes: direct waves are found from the incident waves received by the first directional antenna and the second directional antenna; and the differences of signal strengths of direct waves received by the first directional antenna and signal strengths of direct waves received by the second directional antenna at multiple angles are determined.

In an example embodiment, the step that direct waves are found from the incident waves received by the first directional antenna and the second directional antenna includes: incident waves received by an omnidirectional antenna are acquired; a direct wave is determined according to strengths of the incident waves received by the omnidirectional antenna; direct waves received by the first directional antenna and the second directional antenna at a point of time when the omnidirectional antenna receives the direct wave is taken as the direct waves in the incident waves received by the first directional antenna and the second directional antenna.

In an example embodiment, the step that the angle corresponding to the minimum difference in the differences is taken as the angle between the line connecting the anchor node and the tested node and the horizontal reference line includes: a curve is plotted for the differences of the signal strengths of the incident waves received at the multiple angles with the angles as the X-axis and the differences as the Y-axis; and an angle corresponding to a lowest point of the curve is taken as the angle between the line connecting the anchor node and the tested node and the horizontal reference line.

In an example embodiment, the method is applied to positioning.

In the embodiments of the present disclosure, two directional antennas which are mounted at a same point and are partially superposed are arranged in the anchor node to acquire the incident waves from the tested node at respective angles; then, an angle corresponding to a minimum difference in differences between signal strengths of incident waves received by a first directional antennas and signal strengths of incident waves received by a second directional antenna is taken as the angle of the tested node so as to position the tested node. In this way, the technical problem that a high positioning accuracy and a low complexity of a positioning device cannot be realized at the same time in the related arts is solved, and the technical effect of positioning a target accurately when the positioning device is low in complexity is achieved.

BRIEF DESCRIPTION OF THE DRAWINGS

The drawings illustrated here are to provide further understanding of the present disclosure and constitute one part of the application, and the exemplary embodiments of the present disclosure and the explanations thereof are intended to explain the present disclosure, instead of improperly limiting the present disclosure. In the drawings.

DETAILED DESCRIPTION OF THE EMBODIMENTS

The present disclosure will be described below in combination with the drawings and embodiments in detail. It should be noted that, in case of no conflict, the embodiments of the application and features therein can be combined with one another.

Figure 1:
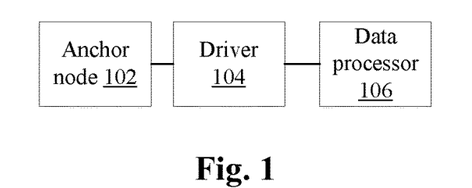
FIG. 1 is an example structural block diagram of a positioning system according to an embodiment of the present disclosure.

An embodiment of the present disclosure provides an example system for determining an angle. In the example embodiment, the system may be applied to positioning, namely, the system may be a positioning system. As shown in FIG. 1, the system includes an anchor node 102, a driver 104 and a data processor 106, which are specifically described below.

Figure 2:
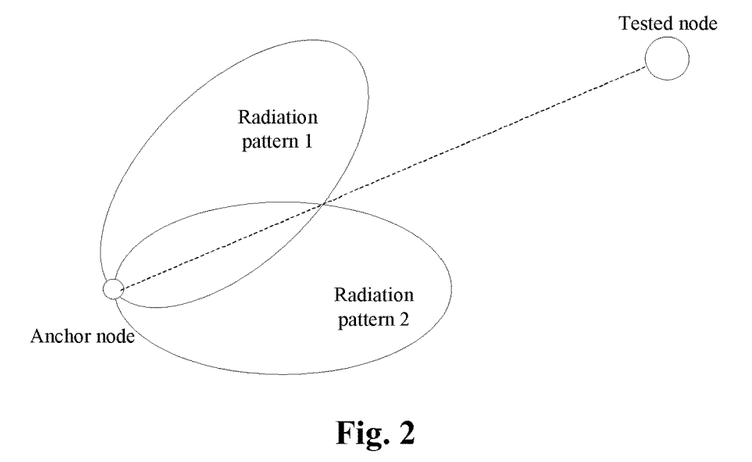
FIG. 2 is an example diagram of an anchor node according to an embodiment of the present disclosure.

1) The anchor node 102 includes a first directional antenna and a second directional antenna, wherein the first directional antenna and the second directional antenna are mounted at a same point and an area formed by the first directional antenna and an area formed by the second directional antenna are partially superposed. For example, as shown in FIG. 2, the anchor node includes a radiation pattern 1 (i.e., the first directional antenna) and a radiation pattern 2 (i.e., the second directional antenna), wherein the two directional antennas are mounted at the same point, namely, the mounting points of the two directional antennas are superposed.

2) The driver 104 is coupled with the anchor node 102 and is configured to drive the first directional antenna and the second directional antenna to rotate according to a predetermined angle with the anchor node as a center and a horizontal line, which is parallel to a horizontal plane and points to a predetermined direction, as a horizontal reference line to receive incident waves from a tested node at multiple angles, wherein the horizontal reference line may be interpreted as a directional line when a stepping motor starts to rotate. In an example embodiment, one horizontal reference line is defined by one anchor node, and each horizontal reference line has a same direction (for example, the horizontal reference lines for various anchor nodes are uniformly defined to point to the due north). To implement positioning, generally, two or more anchor nodes are needed, and the horizontal reference lines defined by all the anchor nodes should horizontal lines pointing to the same direction and parallel to the horizontal plane.

Figure 3:
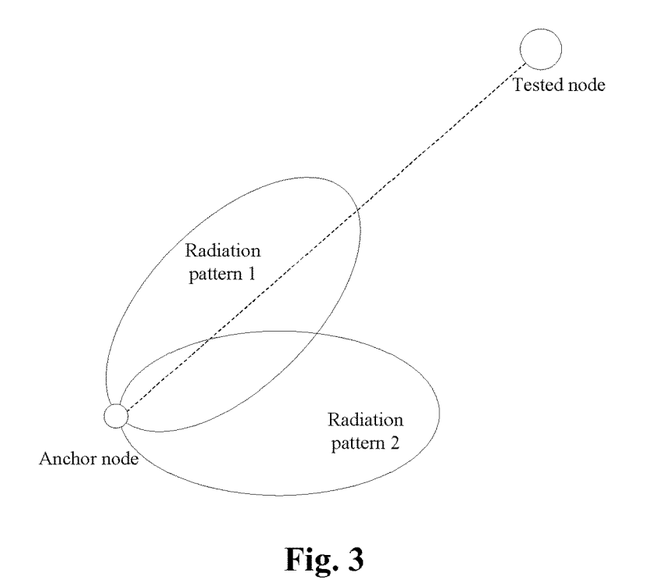
FIG. 3 is another example diagram of an anchor node according to an embodiment of the present disclosure.
Figure 4:
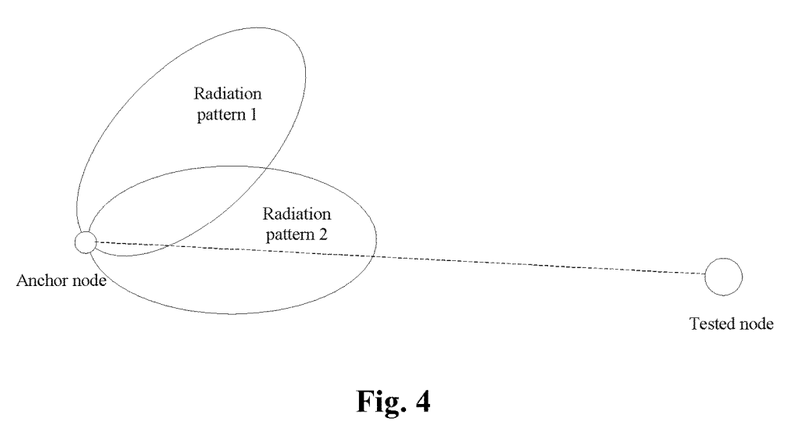
FIG. 4 is another example diagram of an anchor node according to an embodiment of the present disclosure.

Namely, the driver drives the first directional antenna and the second directional antenna in the anchor node to rotate in a certain angle range at a predetermined step so that the two directional antennas of the anchor node can receive signals sent by a tested node at different angles. In this way, if the two antennas receive signals of the same strength from the tested node when rotating to a certain angle, the angle between the tested node and the horizontal reference line can be determined at the moment. As shown in FIG. 2, the signal strengths of incident waves from the tested node to the two directional antennas are the same, while the signal strengths of the incident waves shown in FIGS. 3 and 4 are different. In an example embodiment, the driver may drive the first antenna and the second antenna to rotate within an angle range of 0 to 180 DEG at a step of 0.225 DEG; whereas, this value is only an example embodiment and the anchor node may also be rotated according to other step sizes.

3) The data processor 106 is coupled with the anchor node 102 and is configured to compute differences between signal strengths of incident waves received by the first directional antenna and signal strengths of incident waves received by the second directional antenna at the multiple angles, and determine the angle between the line connecting the anchor node and the tested node and the horizontal reference line according to the differences at the multiple angles.

In an example embodiment, because the rotation may be carried out at a predetermined angle step and the angle at which the signal strengths are completely the same may be missed during the rotation, the signal strengths of the corresponding incident waves in multiple angles may be determined and the angle corresponding to the minimum difference may be approximately taken as the angle of the tested node. In an example embodiment, the data processor is configured to take an angle corresponding to a minimum difference in the differences as the angle between the line connecting the anchor node and the tested node and the horizontal reference line. For the definition of the angle, in order to simplify the operation and reduce the workload of the computation, the angle between the line connecting the mounting node of the two directional antennas and another intersection point in the superposed area of the two directional antennas and the horizontal reference line is 0 when they are superposed, then, the two directional antennas are rotated at an angle of 0 to 180 DEG, and the final rotation angle can be directly taken as the angle between the line connecting the anchor node and the tested node and the horizontal reference line.

In the example embodiment, two directional antennas which are mounted at a same point and are partially superposed are arranged in the anchor node to acquire the incident waves from the tested node at respective angles; then, the angle corresponding to the minimum difference of the signal strengths of the two directional antennas is taken as the angle of the tested node so as to position the tested node. In this way, the technical problem that a high positioning accuracy and a low complexity of a positioning device cannot be realized at the same time in the related arts is solved, and the technical effect of positioning a target accurately when the complexity of the positioning device is low is achieved.

Figure 5:
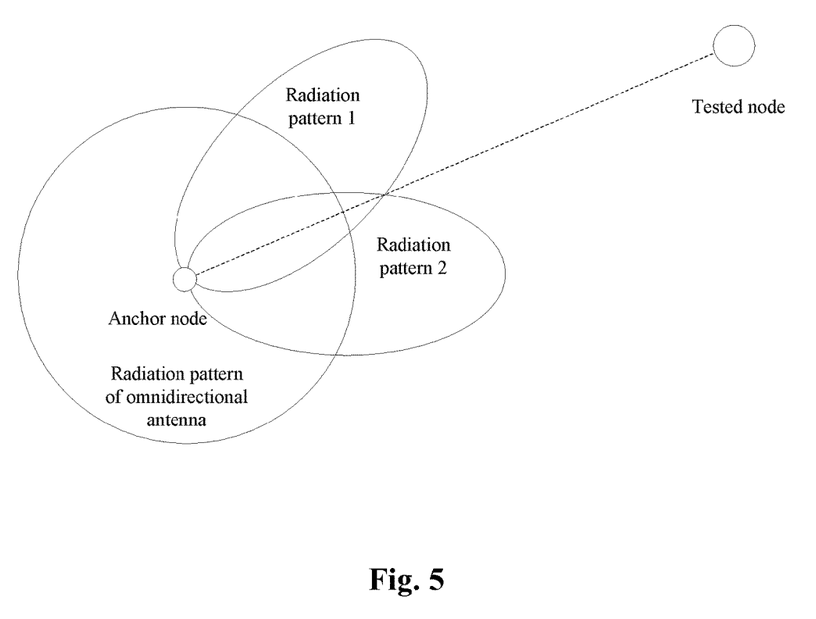
FIG. 5 is an example diagram of an anchor node provided with an omnidirectional antenna according to an embodiment of the present disclosure.

In the actual application, particularly in a short-distance positioning, the environments of the receiving and transmitting antennas are generally very complex (such as in an administrative area), thus, a serious multipath interference can occur easily. However, for the design that the angles of the incident waves are judged through the difference of RSSI at two directional antennas, the received incident waves need to be direct waves from a tested node B to the anchor node; and if non-direct waves are taken as direct waves wrongly, a larger estimation error of the angle of the incident wave can be resulted. In an example embodiment, the anchor node further includes: an omnidirectional antenna which is configured to receive incident waves from the tested node; and the data processor is further configured to determine whether the incident waves received by the first directional antenna and the second directional antenna are direct waves according to the incident waves received by the omnidirectional antenna. Namely, the omnidirectional antenna is added in the anchor node, as shown in FIG. 5, the omnidirectional antenna is mainly configured to distinguish the direct waves in a multipath environment. Due to the omnidirectional antenna, the confusion between the non-direct waves and the direct waves caused by the radiation patterns of the directional antennas shown in FIG. 2 can be avoided. By using the omnidirectional antenna, after the input of a multipath signal including the direct wave, it can be judged which wave is the direct wave according to the strength of the incident waves so as to achieve the effect of reducing the positioning error.

In some example embodiments, the driver may be an angle stepping motor.

Figure 6:
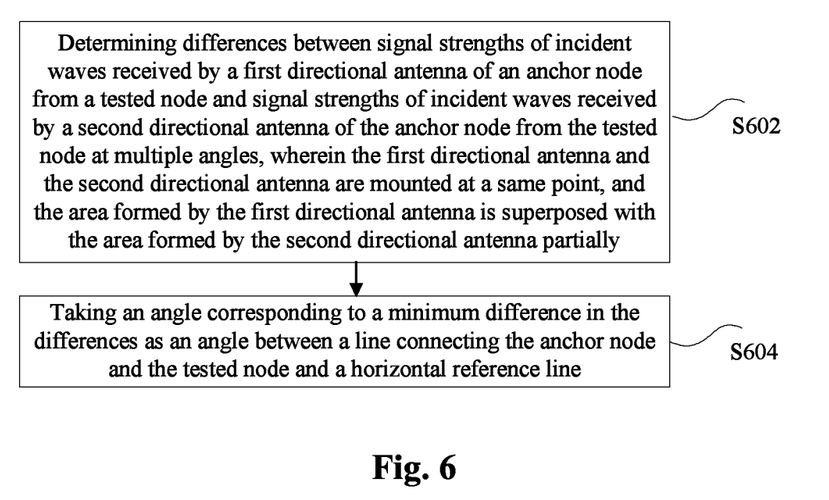
FIG. 6 is an example flowchart of a positioning method according to an embodiment of the present disclosure.

Another embodiment further provides an example method for determining an angle. In the example embodiment, the method may be applied to positioning, as shown in FIG. 6, the method includes the following steps:

Step S602: Differences between signal strengths of incident waves received by a first directional antenna of an anchor node from a tested node and signal strengths of incident waves received by a second directional antenna of the anchor node from the tested node at multiple angles are determined, wherein the first directional antenna and the second directional antenna are mounted at a same point, and an area formed by the first directional antenna is partially superposed with an area formed by the second directional antenna.

Step S604: An angle corresponding to a minimum difference in the differences is taken as an angle between a line connecting the anchor node and the tested node and a horizontal reference line, wherein the horizontal reference line is a horizontal line which is parallel to a horizontal plane and points to a predetermined direction.

In an example embodiment, before the differences of the signal strengths are determined, the method further includes: the anchor node is rotated within an angle range of 0 to 180 DEG with the anchor node as a center and a horizontal line parallel to the horizontal plane as the horizontal reference line so that the first directional antenna and the second directional antenna receive the incident waves sent by the tested node at multiple angles. Namely, the anchor node is driven to rotate to acquire the incident waves from the tested node at multiple angles.

To improve the positioning accuracy and avoid taking the non-direct waves as the direct waves, in an example embodiment, the step that the differences of the signal strengths are determined includes:

Step S1: Direct waves are found from the incident waves received by the first directional antenna and the second directional antenna.

In an example embodiment, the step that direct waves are found from the incident waves received by the first directional antenna and the second directional antenna includes: incident waves received by an omnidirectional antenna are acquired; a direct wave is determined according to strengths of the incident waves received by the omnidirectional antenna; the direct waves received by the first directional antenna and the second directional antenna at a point of time when the omnidirectional antenna receives the direct wave as the direct waves in the incident waves received by the first directional antenna and the second directional antenna.

Step S2: The differences of signal strengths of direct waves received by the first directional antenna and signal strengths of direct waves received by the second directional antenna at multiple angles are determined.

The angle corresponding to the minimum difference may be determined by plotting a curve for the angles and the signal strengths. In an example embodiment, the step that the angle corresponding to the minimum difference is taken as the angle between the line connecting the anchor node and the tested node and the horizontal reference line includes: a curve is plotted for the differences of the signal strengths of the incident waves received at multiple angles with the angles as the X-axis and the differences as the Y-axis; and an angle corresponding to a lowest point of the curve is taken as the angle between the line connecting the anchor node and the tested node and the horizontal reference line.

According to the introduction at the background of the present disclosure, it can be known that the existing short-distance positioning mainly adopts a signal strength technology. One of the root causes of using such a technology is that the technology is relatively easy to implement, sets a relatively low requirement on a positioning node device, and can meet the requirement of low design complexity of the positioning node device. However, the positioning technology based on signal strength has the defects of low positioning accuracy and poor stability, while the positioning technology based on AOA estimation or TOA estimation has the technical problem of high design complexity.

In the embodiments of the disclosure, the AOA-based technology and the signal-strength-based technology are combined so as to lower the technical requirement on the positioning node device on the premise of ensuring the high-accuracy positioning. By virtue of this technical solution, high accuracy, high stability and low complexity of the positioning node are combined efficiently.

The present disclosure is further described below in combination with several specific embodiments. However, it should be noted that the following example embodiments are only for the better description of the present disclosure instead of limiting the present disclosure improperly; moreover, the example embodiments can be combined with one another.

Several terms are described first before the description.

A tested node: which is an object being positioned in a positioning system and has a capability of transmitting a radio frequency signal.

An anchor node: which is a device configured in the positioning system to receive a signal from the tested node and position the tested node according to the radio frequency signal data received from the tested node.

A radiation pattern: which is a polar diagram taking an antenna as a center and representing the change of field intensity against azimuth.

A signal strength of arrival: which represents the strengths of radio frequency signals received in different incident angles in the radiation pattern.

The AOA is estimated by the manner using the two radiation patterns shown in FIG. 2. The anchor node A includes two directional antennas, and the two radiation patterns are partially superposed. When the antenna rotates to the direction shown in FIG. 2, a node B may generate a same signal strength in the two radiation patterns, and a node A can determine the angle according to the change of the signal strength differences of the signal received from the node B corresponding to the two different radiation patterns.

Figure 7:
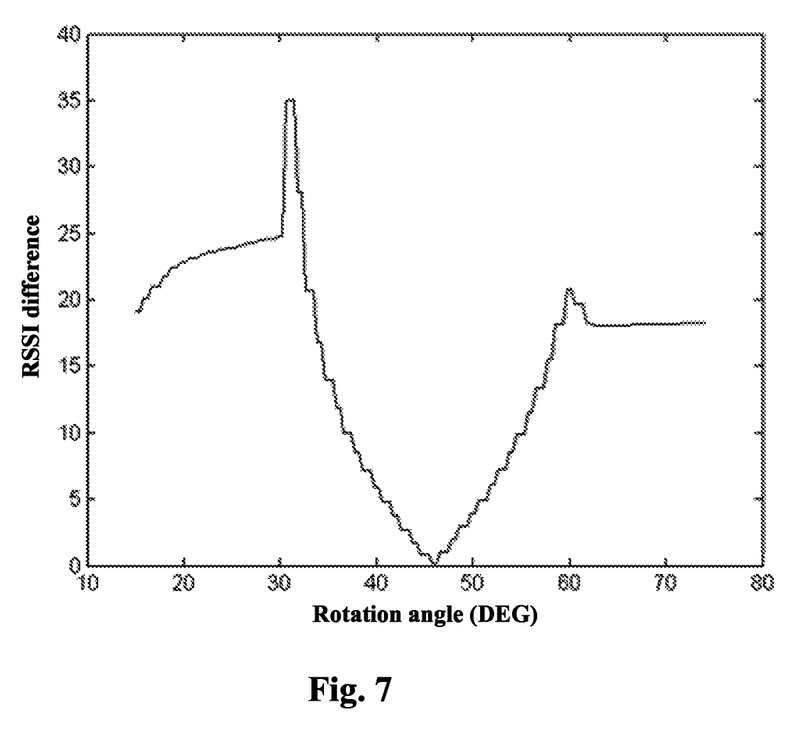
FIG. 7 is a diagram showing a simulation result of a ray tracing method in which an RSSI difference changes along with the rotation angle of an anchor node according to an embodiment of the present disclosure.

FIG. 7 shows a simulation result of a ray tracing method in which the RSSI differences change along with the rotation angle of the anchor node with the diagram shown in FIG. 2 as a simulated object, the environment is a rich multipath indoor environment, wherein the distance between the receiving antenna and the transmitting antenna is 20 m. As shown from FIG. 7, when the two radiation patterns in FIG. 2 do not rotate to the direction shown in FIG. 2, (for example, the positioning angle is 46 DEG), the RSSI difference between the two radiation patterns in FIG. 7 is very large; and when the two radiation patterns in FIG. 2 rotate to align to the unknown node B, the RRSI difference may form a steep acute angle in the result in FIG. 7, which facilitates the acquisition of a high-accuracy AOA easily for the subsequent data processing. The angle between the anchor node and the node can be determined by testing and finding the angle of the anchor node corresponding to the minimum value, and the location of the node can be positioned by the tested angles of a plurality of anchor nodes.

By the method using double radiation patterns, the estimation accuracy is improved greatly, the sensitivity for the beam width of an antenna radiation pattern is also reduced greatly, and the complexity of an estimation algorithm is simplified to a large extent.

Figure 8:
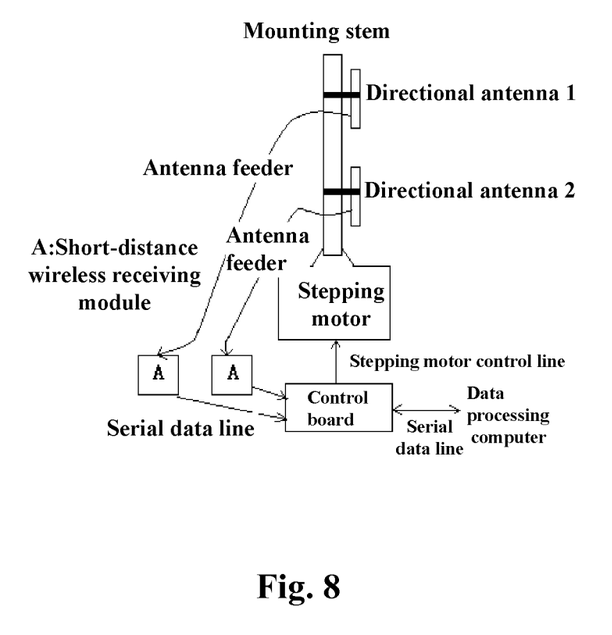
FIG. 8 is a diagram showing an example hardware structure of a positioning testing system according to an embodiment of the present disclosure.

In an example embodiment, a positioning testing system is provided, as shown in FIG. 8, the hardware part consists of the following parts:

1) a tested node, being provided with a wireless transmitting module;

2) an anchor node, mainly including two directional antennas, an angle stepping motor, two short-distance wireless receiving modules A, a control system, a two-way control and the like, and further including matching materials such as a serial port cable, an antenna mounting stem and so on;

3) a data processing computer (equivalent to the data processor 106), the software part of which includes the following parts: tested node software process, signal strength receiving module software process, anchor node control board software process, and data processing computer software process.

Figure 9:
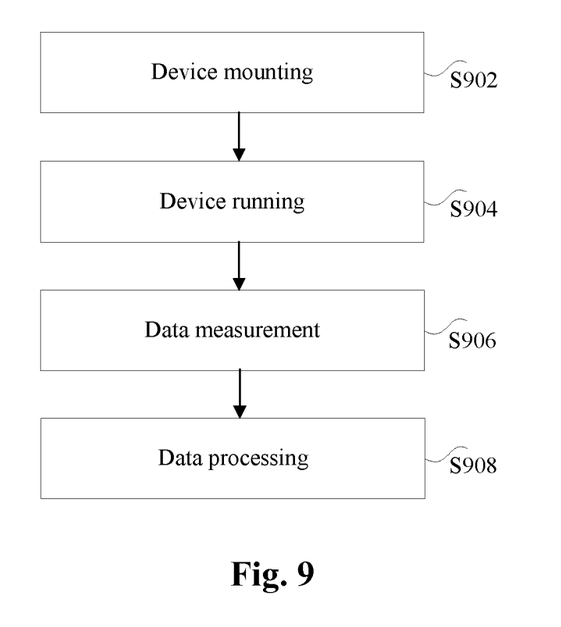
FIG. 9 is a diagram showing the flow from mounting to testing in a positioning method according to an embodiment of the present disclosure.

A method using double radiation patterns based on the positioning testing system shown in FIG. 8, as shown in FIG. 9, includes the following steps S902 to S908:

Step S902: Device mounting:

Step S1: mounting antennas of the anchor node including two directional antennas in FIG. 2;

Step S2: mounting a stepping motor for driving the antennas of the anchor node to rotate;

Step S3: mounting a device which is used for measuring strength of arrival signal and connects the two directional antennas;

Step S4: arranging the tested node in the test area; and

Step S5: connecting and arranging a transmitting line between the signal strength measuring device and the data processing computer.

Step S904: Device running:

Step S1: starting a node to be tested;

Step S2: starting a stepping motor driving the antennas of the anchor node to rotate;

Step S3: starting the device for measuring signal strength of arrival; and

Step S4: starting a computer for receiving data from the device for measuring signal strength of arrival.

Step S906: Data measurement:

Step S1: the device for measuring signal strength of arrival measuring signal strength data; and Step S2: transmitting and storing the signal strength data to a computer.

Step S908: Data processing:

Step S1: a computer calculating the difference based on the received data representing the signal strength of arrival; and Step S2: the computer estimates AOA according to the difference processing result, to obtain an angle corresponding to the minimum difference.

The specific location of the tested node can be finally computed according to the angle information and the location information of each anchor node.

Compared with the existing positioning method based on the RSSI technology, the above-mentioned method can improve the final positioning accuracy and stability to a large extent. Compared with the existing positioning method based on the AOA or TOA technology, the above-mentioned method can effectively reduce the high design index requirement on the tested node and the anchor node, achieves both high accuracy and low complexity, and has a very high project implementation feasibility.

For example, when the anchor node rotates to the angle 1 in FIG. 4, the strength of the signal from the tested node acquired at the directional antenna 1 is A1, and the strength of the signal from the tested node acquired at the directional antenna 2 is B1;

when the anchor node rotates to the angle 2 in FIG. 2, the strength of the signal from the tested node acquired at the directional antenna 1 is A2, and the strength of the signal from the tested node acquired at the directional antenna 2 is B2; and when the anchor node rotates to the angle 3 in FIG. 3, the strength of the signal from the tested node acquired at the directional antenna 1 is A3, and the strength of the signal from the tested node acquired at the directional antenna 2 is B3.

Figure 10:
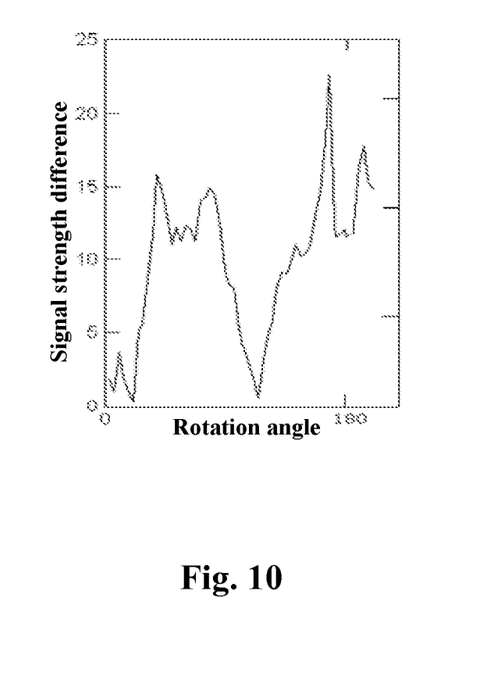
FIG. 10 is an example diagram showing the result of a double radiation pattern differencing processing according to an embodiment of the present disclosure.

The anchor node antenna rotates within an angle range of 0 to 180 DEG at a step of 0.225 DEG. The obtained difference processing result for the double radiation patterns is as shown in FIG. 10. The final relative angle between the tested node and the anchor node is computed according to the analysis of the acute angle in the differencing result in FIG. 10 and noise treatment, and the angle corresponding to the minimum difference is the angle between the anchor node and the tested node.

The AOA may also be estimated by three radiation patterns in FIG. 5. The anchor node A includes two directional antennas and one omnidirectional antenna, wherein the radiation patterns of the two directional antennas are partially superposed. When the antennas rotate to the directions as shown in FIG. 5, a node B may generate a same signal strength in the two radiation patterns, and a node A can determine the angle according to the change of the differences of the strengths of the signal received from the node B corresponding to the two different radiation patterns. The direction of the anchor node A corresponding to the minimum difference is the relative angle between the tested node and the anchor node.

However, since the multipath signals may be relatively rich in a short-distance positioning environment, if the angle is determined only through the directional antennas according to the signal strength of arrival, the signal strengths of some non-direct waves in the directional antennas may be higher than that of direct waves in the directional antennas. Thus, a reflected wave may be wrongly determined as the direct wave to carry out angle estimation, so that a larger estimation error may occur.

Considering that the embodiments of the present disclosure may be applied to a short-distance positioning design, and the multipath signals are very rich in a short-distance environment, therefore, the omnidirectional antenna is added based on the design described above that the AOA is estimated via two directional antennas. The omnidirectional antenna is mainly used for distinguishing the direct wave in a multipath environment. Due to the omnidirectional antenna, the confusion between the non-direct wave and the direct wave caused by the radiation patterns of the directional antennas can be avoided. By virtue of the omnidirectional antenna, after the input of a multipath signal including the direct wave, which is the direct wave can be judged according to the strength of the incident wave.

The three antennas in FIG. 5 are mounted at a same point, so that they can be regarded as one receiving point in a physical space theoretically, and the time when each incident wave in the multipath signal arrives at different antennas can be regarded as the same. For example, the time when the direct wave arrives at the omnidirectional antenna is just the time when the direct wave arrives at the two directional antennas, therefore, the corresponding signal strength extracted from the two directional antennas according to the arrival time of the direct wave extracted by the omnidirectional antenna also corresponds to the signal strength of arrival of the direct wave in the directional antennas. After the signal strength of arrival of the direct wave received by the directional antennas is extracted, the incident angle of the direct wave is estimated according to the method described above.

To sum up, the function of restraining multipath interference of the omnidirectional antenna in the anchor node formed by three antennas is very important for the short-distance environment with rich multipath signals.

Figure 11:
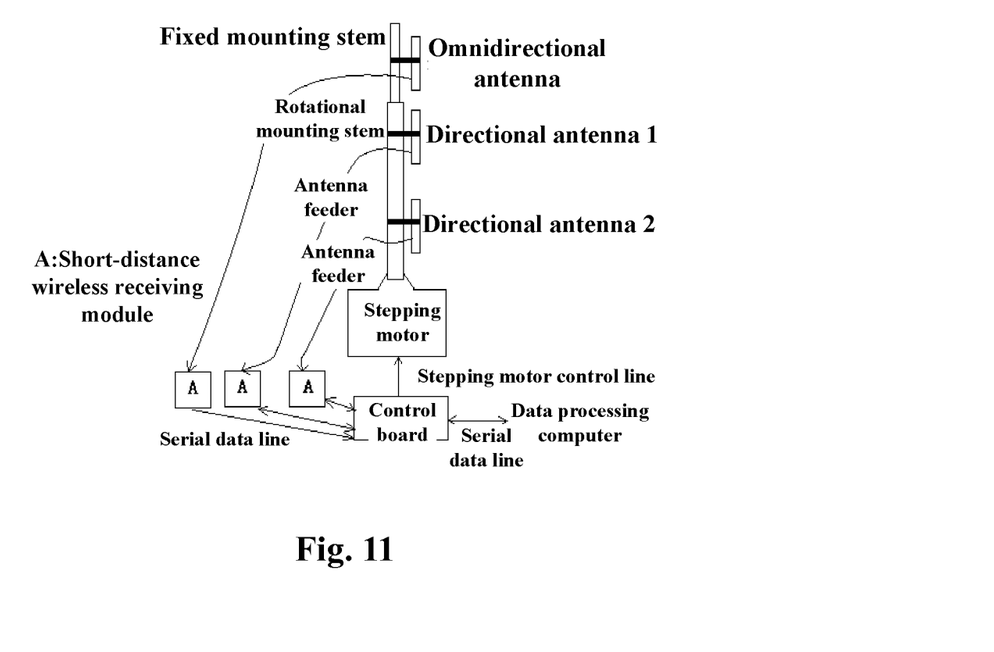
FIG. 11 is a diagram showing another example hardware structure of a positioning testing system according to an embodiment of the present disclosure.

In the example embodiment, as shown in FIG. 11, the hardware part of a positioning testing system consists of the following parts:

1) a tested node, being provided with a wireless transmitting module;

2) an anchor node, mainly including two directional antennas, one omnidirectional antenna, an angle stepping motor, a tri-channel short-distance wireless receiving module, a control system, a two-way control and the like, and further including matching materials such as a serial port cable, an antenna mounting stem and so on;

3) a data processing computer (equivalent to the data processor 106), the software part of which includes the following parts: tested node software process, omnidirectional antenna direct wave incidence time extracting software process, directional signal strength receiving module software process, anchor node control board software process, and data processing computer software process.

The operation of the positioning testing system based on FIG. 11 is similar to that shown in FIG. 9, and the difference is as follows:

1) in the device mounting process in Step S902, the omnidirectional antenna is mounted and a non-rotatable fixed mounting stem is used to connect the omnidirectional antenna;

2) the data measurement in Step S906 further includes measuring the incidence time of direct wave corresponding to the omnidirectional antenna and measuring the signal strength of arrival corresponding to the directional antennas at the incidence time of direct wave. The directional antennas acquire the direct wave mainly according to the TOA of the direct wave estimated by virtue of the omnidirectional antenna.

Figure 12:
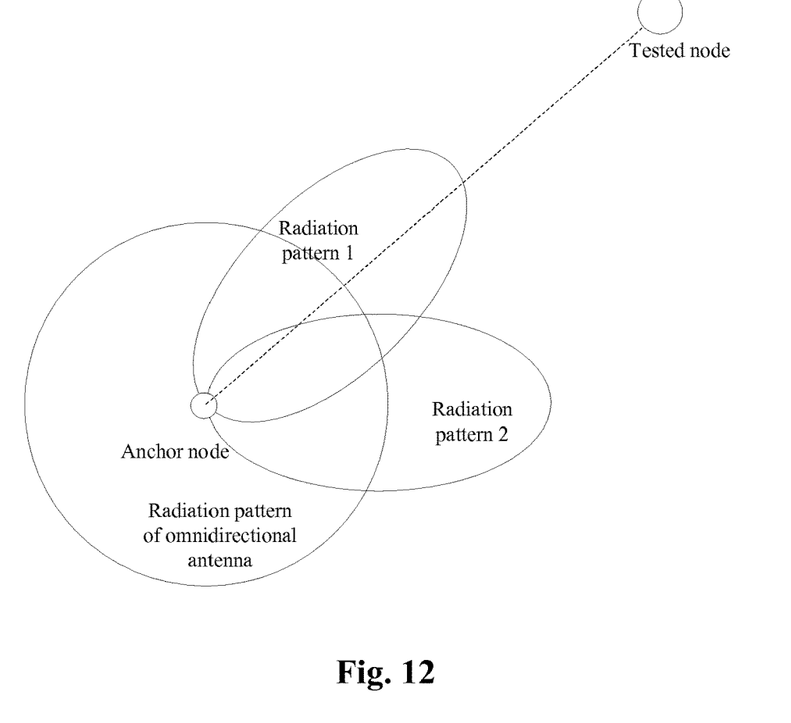
FIG. 12 is another example diagram of an anchor node provided with an omnidirectional antenna according to an embodiment of the present disclosure.

For example,

When the anchor node rotates to angle 1 in FIG. 12, according to the direct wave incidence time acquired by virtue of the omnidirectional antenna, the direct wave signal strength between the tested node and the anchor node acquired at the directional antenna 1 is A1, and the direct wave signal strength between the tested node and the anchor node acquired at the directional antenna 2 is B1.

When the anchor node rotates to angle 2 in FIG. 5, the tested node forms a direct wave receiving signal at the intersection point of two directional antenna radiation patterns, and according to the direct wave incidence time acquired by virtue of the omnidirectional antenna, the direct wave signal strength between the tested node and the anchor node acquired at the directional antenna 1 is A2, and the direct wave signal strength between the tested node and the anchor node acquired at the directional antenna 2 is B2.

Figure 13:
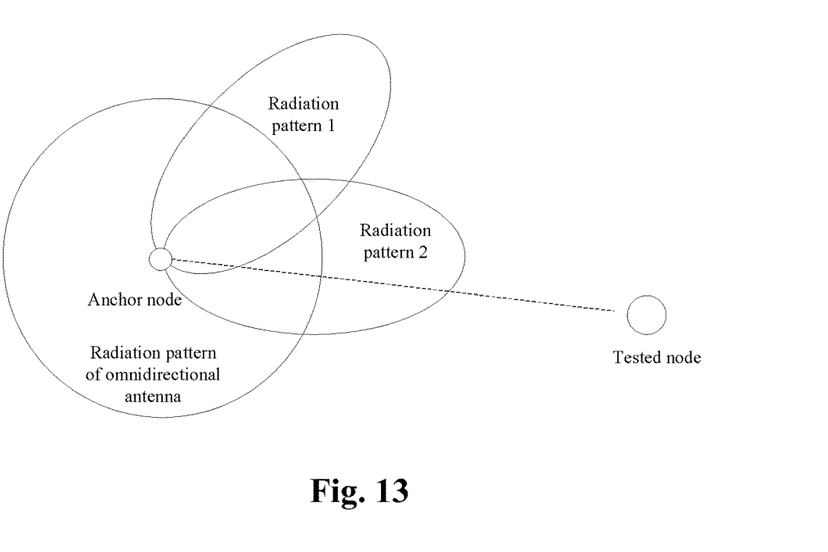
FIG. 13 is another example diagram of an anchor node provided with an omnidirectional antenna according to an embodiment of the present disclosure.

When the anchor node rotates to angle 3 in FIG. 13, according to the direct wave incidence time acquired by virtue of the omnidirectional antenna, the direct wave signal strength between the tested node and the anchor node acquired at the directional antenna 1 is A3, and the direct wave signal strength between the tested node and the anchor node acquired at the directional antenna 2 is B3.

Figure 14:
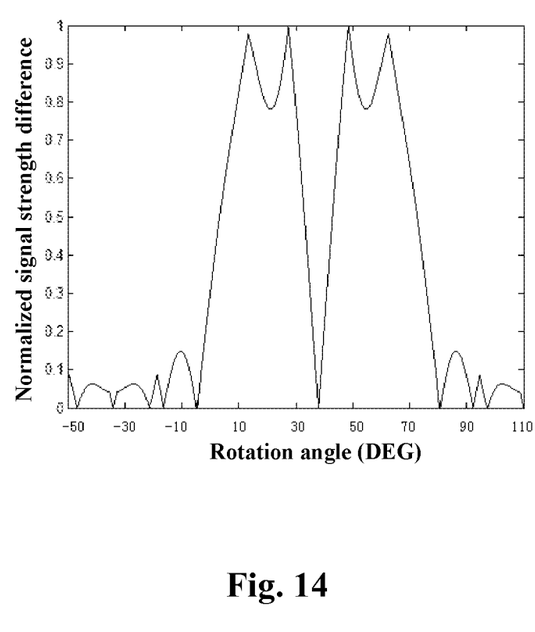
FIG. 14 is another example diagram showing the result of a triple radiation pattern differencing processing according to an embodiment of the present disclosure.

As an example, the anchor node may rotate within an angle range of 0 to 180 DEG at a step of 1 DEG, then the result of the differencing processing based on the radiation patterns is as shown in FIG. 14, the final relative angle between the tested node and the anchor node is computed according to the analysis for the acute angle in the differencing result in FIG. 14 and noise treatment, and the angle corresponding to the minimum difference is the angle between the anchor node and the tested node.

In another embodiment, software is further provided, which is configured to execute the technical solutions described in the embodiments and example embodiments above.

In another embodiment, a storage medium is further provided, in which the software is stored. The storage medium includes but is not limited to a compact disk, a floppy disk, a hard disk, an erasable memory and the like.

From what described above, it can be seen that the embodiments of the present disclosure have the following technical effects: two directional antennas which are mounted at a same point and are partially superposed are arranged in the anchor node to acquire the incident waves of the measured node at respective angles; then, the angle corresponding to the minimum difference of the signal strengths of the two directional antennas is taken as the angle of the measured node so as to position the measured node. In this way, the technical problem that a high positioning accuracy and a low complexity of a positioning device cannot be realized at the same time in the related arts is solved, and the technical effect of positioning a target accurately when the complexity of the positioning device is low is achieved.

Obviously, those skilled in the art shall understand that the modules or steps of the present disclosure may be implemented by general computing apparatus and centralized in a single computing apparatus or distributed in a network consisting of multiple computing apparatus. Optionally, the modules or steps may be implemented by program codes executable by the computing apparatus, so that they may be stored in a storage apparatus and executed by the computing apparatus, and, in some cases, the steps can be executed in a sequence different from the illustrated or described sequence, or they are respectively made into the integrated circuit modules or many of them are made into a single integrated circuit module. Thereby, the embodiments of the present disclosure are not limited to any specific combination of hardware and software.

The above are only the example embodiments of the present disclosure and not intended to limit the present disclosure. For those skilled in the art, various modifications and changes can be made in the present disclosure. Any modifications, equivalent replacements, improvements and the like within the spirit and principle of the present disclosure shall fall within the scope of protection of the present disclosure.

INDUSTRIAL APPLICABILITY

The technical solution provided by the embodiments of the present disclosure can be applied to the field of LBS, solves the technical problem that a high positioning accuracy and a low complexity of a positioning device cannot be realized at the same time in the related arts, and can accurately position a target when the complexity of the positioning device is low.

What is claimed is:

1. A system for determining an angle, comprising: an anchor node, a driver and a data processor, wherein
the anchor node comprises a first directional antenna and a second directional antenna, wherein the first directional antenna and the second directional antenna are mounted at a same point, and an area formed by the first directional antenna is partially superposed with an area formed by the second directional antenna;
the driver is coupled with the anchor node and is configured to drive the first directional antenna and the second directional antenna to rotate according to a predetermined angle with the anchor node as a center and a horizontal line, which is parallel to a horizontal plane and points to a predetermined direction, as a horizontal reference line to receive incident waves from a tested node at multiple angles; and
the data processor is coupled with the anchor node and is configured to compute differences between signal strengths of incident waves received by the first directional antenna and signal strengths of incident waves received by the second directional antenna at the multiple angles, and determine an angle between a line connecting the anchor node and the tested node and the horizontal reference line according to the differences at the multiple angles,
wherein the data processor is configured to take an angle corresponding to a minimum difference in the differences as the angle between the line connecting the anchor node and the tested node and the horizontal reference line.

2. The system according to claim 1, wherein
the anchor node further comprises: an omnidirectional antenna which is configured to receive incident waves from the tested node; and
the data processor is further configured to determine whether the incident waves received by the first directional antenna and the second directional antenna are direct waves according to the incident waves received by the omnidirectional antenna,
wherein the data processor is further configured to determine the direct wave according to strengths of the incident waves received by the omnidirectional antenna; and take direct waves received by the first directional antenna and the second directional antenna at a point of time when the omnidirectional antenna receives the direct wave as the direct waves in the incident waves received by the first directional antenna and the second directional antenna.

3. The system according to claim 2, wherein the system for determining the angle is a positioning system.

4. The system according to claim 1, wherein the driver is an angle stepping motor.

5. The system according to claim 4, wherein the system for determining the angle is a positioning system.

6. The system according to claim 1, wherein the driver is configured to drive the first directional antenna and the second directional antenna to rotate within an angle range of 0 to 180 DEG at a step of 0.225 DEG.

7. The system according to claim 6, wherein the system for determining the angle is a positioning system.

8. The system according to claim 1, wherein the system for determining the angle is a positioning system.

9. A method for determining an angle, applied in a system for determining an angle, the system comprising an anchor node, a driver, and a data processor (106), the method comprising:

determining, by the data processor, differences between signal strengths of incident waves received by a first directional antenna of the anchor node from a tested node and signal strengths of incident waves received by a second directional antenna of the anchor node from the tested node at multiple angles, wherein the first directional antenna and the second directional antenna are mounted at a same point, and an area formed by the first directional antenna is partially superposed with an area formed by the second directional antenna, wherein the first directional antenna and the second directional antenna to rotate according to a predetermined angle with the anchor node as a center and a horizontal line, which is parallel to a horizontal plane and points to a predetermined direction, as a horizontal reference line to receive incident waves from the tested node at multiple angles; and
taking, by the data processor, an angle corresponding to a minimum difference in the differences as an angle between a line connecting the anchor node and the tested node and a horizontal reference line, wherein the horizontal reference line is a horizontal line which is parallel to a horizontal plane and points to a predetermined direction.

10. The method according to claim 9, wherein before determining the differences of the signal strengths, the method further comprises:
rotating the anchor node within an angle range of 0 to 180 DEG with the anchor node as a center and a horizontal line parallel to the horizontal plane as the horizontal reference line so that the first directional antenna and the second directional antenna receive the incident waves sent by the tested node at multiple angles.

11. The method according to claim 10, wherein the method is applied to positioning.

12. The method according to claim 9, wherein determining the differences of the signal strengths comprises:
finding direct waves from the incident waves received by the first directional antenna and the second directional antenna; and
determining the differences between signal strengths of direct waves received by the first directional antenna and signal strengths of direct waves received by the second directional antenna at the multiple angles.

13. The method according to claim 12, wherein the method is applied to positioning.

14. The method according to claim 12, wherein finding the direct waves from the incident waves received by the first directional antenna and the second directional antenna comprises:
acquiring incident waves received by an omnidirectional antenna;
determining a direct wave according to strengths of the incident waves received by the omnidirectional antenna; and
taking direct waves received by the first directional antenna and the second directional antenna at a point of time when the omnidirectional antenna receives the direct wave as the direct waves in the incident waves received by the first directional antenna and the second directional antenna.

15. The method according to claim 14, wherein the method is applied to positioning.

16. The method according to claim 9, wherein taking the angle corresponding to the minimum difference in the differences as the angle between the line connecting the anchor node and the tested node and the horizontal reference line comprises:

plotting a curve for the differences of the signal strengths of the incident waves received at the multiple angles with the angles as the X-axis and the differences as the Y-axis; and     taking an angle corresponding to a lowest point of the curve as the angle between the line connecting the anchor node and the tested node and the horizontal reference line.

17. The method according to claim 16, wherein the method is applied to positioning.

18. The method according to claim 9, wherein the method is applied to positioning.

\* \* \* \* \*